US011753065B1

(12) United States Patent
Soderlind et al.

(10) Patent No.: US 11,753,065 B1
(45) Date of Patent: Sep. 12, 2023

(54) STEERING COLUMN RETRACTION INITIATOR

(71) Applicant: Ford Global Technologies, LLC, Dearborn, MI (US)

(72) Inventors: Erik William Soderlind, Harrison Township, MI (US); Taras Palczynski, Ann Arbor, MI (US); Steven Bryan Amburgy, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/699,254

(22) Filed: Mar. 21, 2022

(51) Int. Cl.
*B62D 1/19* (2006.01)
*B62D 5/00* (2006.01)

(52) U.S. Cl.
CPC ............ *B62D 1/192* (2013.01); *B62D 5/006* (2013.01)

(58) Field of Classification Search
CPC ................................ B62D 1/192; B62D 5/006
See application file for complete search history.

(56) References Cited

U.S. PATENT DOCUMENTS

| | | | | |
|---|---|---|---|---|
| 9,428,211 B2* | 8/2016 | Vermeersch | ............ | B62D 1/19 |
| 9,428,215 B1* | 8/2016 | Nagatani | ................ | B62D 1/184 |
| 11,014,595 B2* | 5/2021 | Davies | ................... | B62D 1/184 |
| 2018/0105196 A1* | 4/2018 | Bodtker | ................ | B62D 1/192 |
| 2018/0111640 A1* | 4/2018 | Bodtker | ................ | B62D 1/181 |
| 2020/0172149 A1* | 6/2020 | Appleyard | ............ | B62D 1/192 |

FOREIGN PATENT DOCUMENTS

| CN | 112829819 A | * | 5/2021 | ............ | B60R 21/16 |
|---|---|---|---|---|---|
| WO | WO-2018154322 A1 | * | 8/2018 | ............ | B62D 1/184 |
| WO | WO-2020211987 A1 | * | 10/2020 | ............ | B62D 1/181 |

* cited by examiner

*Primary Examiner* — Drew J Brown
(74) *Attorney, Agent, or Firm* — Burr & Forman LLP; Lorne Forsythe

(57) ABSTRACT

A handwheel actuator for a steer by wire system of a vehicle may include a column for operably coupling a handwheel to other components of the steer by wire system and a feedback actuator operably coupled to the column to provide tactile feedback to the operator responsive to movement of the handwheel. The column may include a lower column portion and an upper column portion that are movable relative to each other to alternately retract the handwheel away from an operator seated in the vehicle or extend the handwheel toward the operator. The column may further include a frictional engagement assembly and a time-specific release initiator. The frictional engagement assembly may be engaged to fix the lower column portion relative to the upper column portion at a selected distance from the operator, and disengaged to enable movement of the upper column portion relative to the lower column portion. The time-specific release initiator may be actuated by an electrical trigger signal to cause the lower column portion and the upper column portion to be disengaged a selected time after a triggering event.

20 Claims, 9 Drawing Sheets

STEERING COLUMN RETRACTION INITIATOR

TECHNICAL FIELD

Example embodiments generally relate to vehicle control technology and, more particularly, relate to an initiator to enable specifically timing the ability for retraction of a steering column in a steer by wire system.

BACKGROUND

Vehicles are consistently moving toward the integration of electrical or electro-mechanical components that perform various vehicle functions that were previously performed using mechanical linkages. Drive by wire, steer by wire and brake by wire are some examples of this migration away from mechanical linkages. A result of this migration is that vehicles may become lighter, and easier to service and maintain.

In addition to the advantages noted above, the design and integration of new components for steer by wire systems may provide additional opportunities for automatic control functions. For example, specific timing triggers for providing or enabling movement of components for various scenarios that the vehicle may encounter could potentially be defined.

BRIEF SUMMARY OF SOME EXAMPLES

In accordance with an example embodiment, a handwheel actuator for a steer by wire system of a vehicle may be provided. The handwheel actuator may include a column for operably coupling a handwheel to other components of the steer by wire system and a feedback actuator operably coupled to the column to provide tactile feedback to the operator responsive to movement of the handwheel. The column may include a lower column portion and an upper column portion that are movable relative to each other to alternately retract the handwheel away from an operator seated in the vehicle or extend the handwheel toward the operator. The column may further include a frictional engagement assembly and a time-specific release initiator. The frictional engagement assembly may be engaged to fix the lower column portion relative to the upper column portion at a selected distance from the operator, and disengaged to enable movement of the upper column portion relative to the lower column portion. The time-specific release initiator may be actuated by an electrical trigger signal to cause the lower column portion and the upper column portion to be disengaged a selected time after a triggering event.

In another example embodiment, a steer by wire system of a vehicle may be provided. The system may include a steering assembly operably coupled to steerable wheels of the vehicle, a steering motor operably coupled to the steering assembly, a handwheel actuator operably coupled to a handwheel of the vehicle to receive steering inputs from an operator of the vehicle, and a controller operably coupled to the handwheel actuator and the steering motor to translate the steering inputs to control signals for the steering motor. The handwheel actuator may include a column for operably coupling a handwheel to other components of the steer by wire system and a feedback actuator operably coupled to the column to provide tactile feedback to the operator responsive to movement of the handwheel. The column may include a lower column portion and an upper column portion that are movable relative to each other to alternately retract the handwheel away from an operator seated in the vehicle or extend the handwheel toward the operator. The column may further include a frictional engagement assembly and a time-specific release initiator. The frictional engagement assembly may be engaged to fix the lower column portion relative to the upper column portion at a selected distance from the operator, and disengaged to enable movement of the upper column portion relative to the lower column portion. The time-specific release initiator may be actuated by an electrical trigger signal to cause the lower column portion and the upper column portion to be disengaged a selected time after a triggering event.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
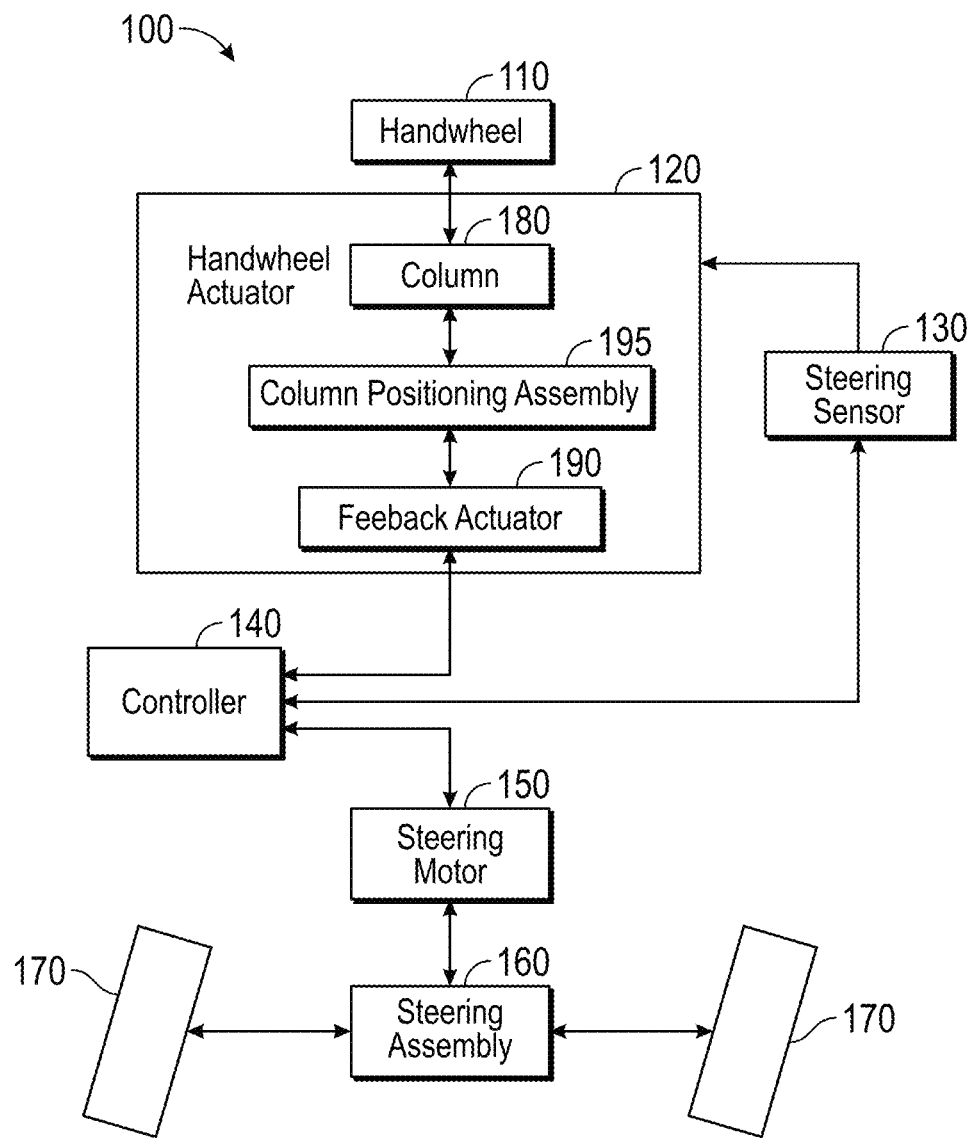
FIG. 1 illustrates a block diagram of a steer by wire system of a vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, steer by wire systems may provide new opportunities for control systems or component arrangements that would previously be impractical. One such component arrangement may be a steering column with deep stow capability. The deep stow capability refers to the possibility to extend the steering column away from the instrument panel or retract the steering column fully (or nearly fully) into the instrument panel. In some cases, a movement of up to 310 mm for the steering column may be possible to enable the steering column (and perhaps also the steering wheel) to be inserted into the instrument panel to the point they effectively disappear. This technology may permit what may be referred to as a reconfigurable cockpit, which can be reconfigured for autonomous operation, where no steering wheel need be extended from the instrument panel, or manual operation, where the steering wheel clearly needs to be extended from the instrument panel.

Although certainly not the only context in which example embodiments may be useful, the reconfigurable cockpit in a steer by wire system offers one extreme example in which large amounts of movement of the handwheel, and steering column, may be desirable. Manual positioning of the handwheel and steering column in such a system may clearly be used to change between the autonomous operation configuration and the manual operation configuration, but the operator or driver may also wish to select a comfortable placement for the handwheel in front of the operator. To accomplish this, the steering column typically includes a lever or other operable member that the operator can actuate to permit manual positioning of the handwheel and steering column via a positioning assembly. In some cases, the positioning assembly may include a cam or other rotatable toothed component that can be, e.g., via moving the lever, alternately either engaged with an energy absorption strap (to fix the position of the handwheel) or disengaged from the energy absorption strap (to allow repositioning of the handwheel). In this context, the energy absorption strap is typically retained in such a way that it can break away or otherwise release or disengage to permit movement (e.g., retraction) of the steering column if a barrier event is encountered.

In particular, in response to the barrier event, the energy absorption strap may break away or release when sufficient force is placed on it to cause some breakaway feature that is designed to be broken under a certain load to give way. This naturally requires some time to build up sufficient force to break the breakaway feature, and the timing of the release is highly variable and can be uncertain. In this regard, since the entire process relies on force versus displacement calculations, there is a great degree of variability that may be encountered across any number of different scenarios.

Example embodiments are directed to a control paradigm that enables very precise timing to be defined for the release of the handwheel and steering column to permit their retraction. In this regard, by employing a pyrotechnic actuator that is electronically triggered, an electronic signal, which itself may have timing that is specifically selected, may provide the initiation of a release of the handwheel and steering column to allow the retraction of these components to be precisely timed. As noted above, although not required to be instantiated explicitly in a steer by wire system, an example within such a system will be described herein. FIG. 1 illustrates a block diagram of some components of a steer by wire system 100 in accordance with an example embodiment. Of note, although the components of FIG. 1 may be part of or operably coupled to the vehicle, it should be appreciated that such connection(s) may be either direct or indirect. Moreover, some of the components of the steer by wire system 100 may be connected to the vehicle via intermediate connections to other components either of the chassis or of other electronic and/or mechanical systems or components.

Referring now to FIG. 1, the steer by wire system 100 may include a handwheel 110, which is located within a vehicle for manual manipulation by a driver or operator of the vehicle. The handwheel 110 is typically a traditional steering wheel, and therefore may be round and rotatable about an axis. However, other structures could be substituted for implementation as the handwheel 110 in alternative embodiments. The movements (typically rotations) of the handwheel 110 are communicated to a handwheel actuator 120 that is operably coupled to the handwheel 110. The handwheel 110 and/or the handwheel actuator 120 may also be operably coupled to one or more steering sensors 130 that may be configured to determine steering angle and/or torque input at the handwheel 110. In some cases, the steering sensor 130 (or sensors) may be part of the handwheel actuator 120. However, the steering sensor 130 could alternatively be a separate component.

In an example embodiment, the handwheel actuator 120 and/or the steering sensor 130 may be operably coupled to a controller 140. In some cases, the controller 140 may be part of an electronic control system of the vehicle (e.g., the ECU or RCM of the vehicle). The controller 140 may therefore also be configured to perform other tasks related or not related to steer by wire control or performance management. However, the controller 140 could be a dedicated or standalone controller in some cases. Processing circuitry (e.g., a processor and memory) at the controller 140 may process the information received by, for example, running one or more control algorithms based on the information received. The control algorithms may include instructions that can be stored by the memory for retrieval and execution by the processor. In some cases, the memory may further store one or more tables (e.g., look up tables) and various calculations and/or applications may be executed using information in the tables and/or the information to generate outputs to a steering motor 150 based on the inputs received (e.g., from the handwheel actuator 120 and/or steering sensor 130). Moreover, in some embodiments, the control algorithms may include instructions for triggering various control signals to be sent to components of the steer by wire system. One such control signal may be provided to the pyrotechnic actuator mentioned above, which will be described in greater detail below.

In an example embodiment, the steering motor 150 (or steering actuator) may be an electrical motor that is operably coupled to a steering assembly 160 to drive the steering assembly 160 to turn wheels 170 (typically front wheels) of the vehicle. The steering assembly 160 may include one or more of a chain, flexible looped drive member, steering gear(s), rack and pinion, direct drive, or other structures that communicate steering torque to the wheels 170.

In an example embodiment, the handwheel actuator 120 may include subcomponents that may be made by different manufacturers, suppliers or sourcing agents, which are often simply referred to as original equipment manufacturers (OEMs). In this regard, for example, the handwheel actuator 120 may include a column 180 and a feedback actuator 190. The column 180 may include structural interfaces to the handwheel 110 to enable the rotational inputs at the handwheel 110 to be communicated to the controller 140 for generation of inputs to the steering motor 150. The feedback actuator 190 may include an electric motor and other components that are designed to provide feedback that gives operators a tactile response similar to that of conventional mechanical or hydraulic steering systems.

As noted above, the use of the handwheel actuator 120 creates significant flexibility in terms of enabling designers to easily change steering ratios and torque resistances or otherwise modify steering functionality. In this regard, for example, relatively simple software commands may enable such alteration instead of any physical component replacement or manipulation. Additionally, by not mechanically linking the handwheel 110 to the wheels 170, greater flexibility is unlocked in terms of other aspects of vehicle design, including stowable handwheels and/or steering columns for self-driving options coming in the future.

As noted above, the handwheel 110 and column 180 may be able to be manually positioned (e.g., relative to an instrument panel or front dashboard inside the cockpit of the vehicle). To accomplish the manual positioning, a column positioning assembly 195 of an example embodiment may be provided. The column positioning assembly 195 may enable the operator to manually select a position of the handwheel 110 by extending or retracting the column 180 from or into the instrument panel. However, unlike conventional systems in which a breakaway feature that uses a force versus displacement paradigm to control rapid release of the column 180 in response to a barrier event, the column positioning assembly 195 of an example embodiment will utilize specifically timed electronic signal controls via the pyrotechnic actuator described in greater detail below.

In some cases, components that form the column positioning assembly 195 may be part of the feedback actuator 190 or the column 180, and need not be separate components or modules themselves. Thus, for example, in some cases, the column positioning assembly 195 may be defined as components of the column 180 that interface with each other to operably couple the column 180 to each other, and permit relative movement therebetween under specifically defined conditions. However, some components of the column positioning assembly 195 may be considered to be part of a separate module from each or either of the column 180 and the feedback actuator 190 in some cases.

Figure 2:
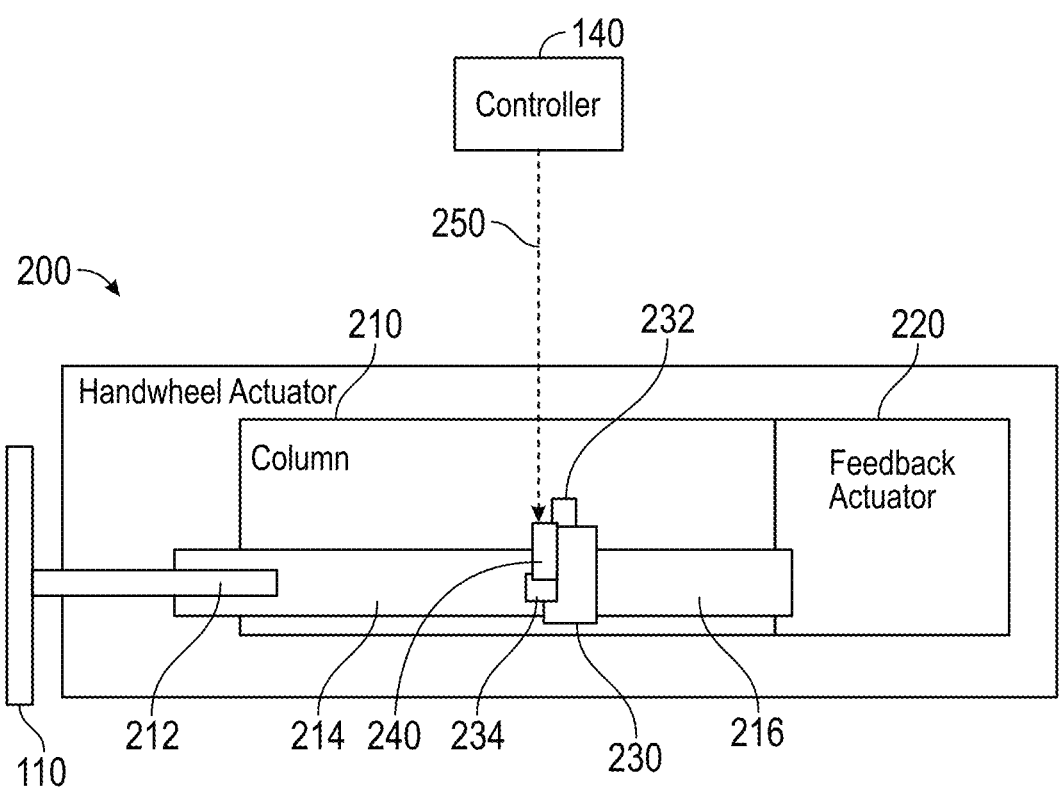
FIG. 2 illustrates a schematic view of a handwheel actuator in accordance with an example embodiment.

FIGS. 2-8 demonstrate some specific structures that may be used to implement various aspects of the steer by wire system 100 of FIG. 1. FIG. 2 illustrates a schematic view of a handwheel actuator 200, which may be an example of the handwheel actuator 120 of FIG. 1. In FIG. 2, a column portion (or column 210) and feedback actuator portion (or feedback actuator 220) may be understood to be separable modules or component that may be joined at an interface therebetween. The column 210 is an example of the column 180, and the feedback actuator 220 is an example of the feedback actuator 190 of FIG. 1.

The column 210 may include an upper steering shaft 212 that may be supported or held in place by an upper steering jacket 214. The upper steering jacket 214 may be operably coupled to a lower column casting 216 (which may be referred to as a lower steering jacket). The upper steering jacket 214 and the lower column casting 216 may combine to form a housing of the column 210. The upper steering shaft 212 may be operably coupled to a handwheel (e.g., handwheel 110) at one end (i.e., a proximal end), and may be operably coupled to (or integrally formed with) a lower steering shaft at the opposing end (i.e., a distal end thereof relative to the handwheel 110). The upper steering shaft 212 and the lower steering shaft may combine to form a steering shaft or column shaft of the column 210.

In an example embodiment, the upper steering jacket 214 may be operably coupled to the lower column casting 216 to enclose the lower steering shaft entirely therein, which is why the lower steering shaft is not visible externally in many cases. In some cases, the lower column casting 216 and the upper steering shaft 212 may be operably coupled in such a way that permits the upper steering jacket 214 to slide deeper into the lower column casting 216 (e.g., telescopically retracting), or permits the upper steering jacket 214 (and upper steering shaft 212) to be extended away from the lower column casting 216. As such, a degree to which the upper steering jacket 214 can move within the lower column casting 216 may define how much movement of the handwheel 110 may be possible between fully extended and fully retracted conditions.

In some embodiments, a rake bracket 230 may be operably coupled to the lower column casting 216 and may be repositioned relative to the upper steering jacket 214 to determine the position of the handwheel 110. In this regard, for example, the rake bracket 230 may be fixed relative to the lower column casting 216 and selectably engageable with, and temporarily fixable relative to, the upper steering jacket 214 to allow the upper steering jacket 214 to retract into the lower column casting 216. However, this paradigm could alternatively be reversed. In any case, the rake bracket 230 may be manually locked or unlocked at a selected position by manual operation (by the operator) of a lever 232. The lever 232 may alternately engage or disengage a frictional engagement assembly 234 that either fixes the rake bracket 230 relative to the upper steering jacket 214, or enables repositioning or sliding therebetween. When the lever 232 is in a locked position, the frictional engagement assembly 234 may be engaged (or locked) to fix the upper steering jacket 214 (and upper steering shaft 212) relative to the lower column casting 216. When the lever 232 is in an unlocked position, the frictional engagement assembly 234 may be disengaged (or unlocked) to release the upper steering jacket 214 (and upper steering shaft 212) to enable movement relative to the lower column casting 216.

Within the general context of example embodiments, the lever 232 may be replaced by an alternative structure such as an electronic or other operable member. Additionally, the frictional engagement assembly 234 can take a number of different forms. For example, the frictional engagement assembly 234 could include opposing sets of teeth (e.g., one on a portion of the upper steering jacket 214, and the other on a portion of the lower column casing 216, or the rake bracket 230), one set of teeth engaging a grooved, perforated, ribbed, knurled or other frictionally resistive surface, or opposing sets of grooved, perforated, ribbed, knurled or other frictionally resistive surfaces. Finally, as noted above, a time-specific release initiator 240 may be provided to force disengagement of the frictional engagement assembly 234 at a timing specified by designers responsive to an electronic trigger signal 250 from the controller 140. In an example embodiment, the time-specific release initiator 240 may be a pyrotechnic actuator.

Figure 3A:
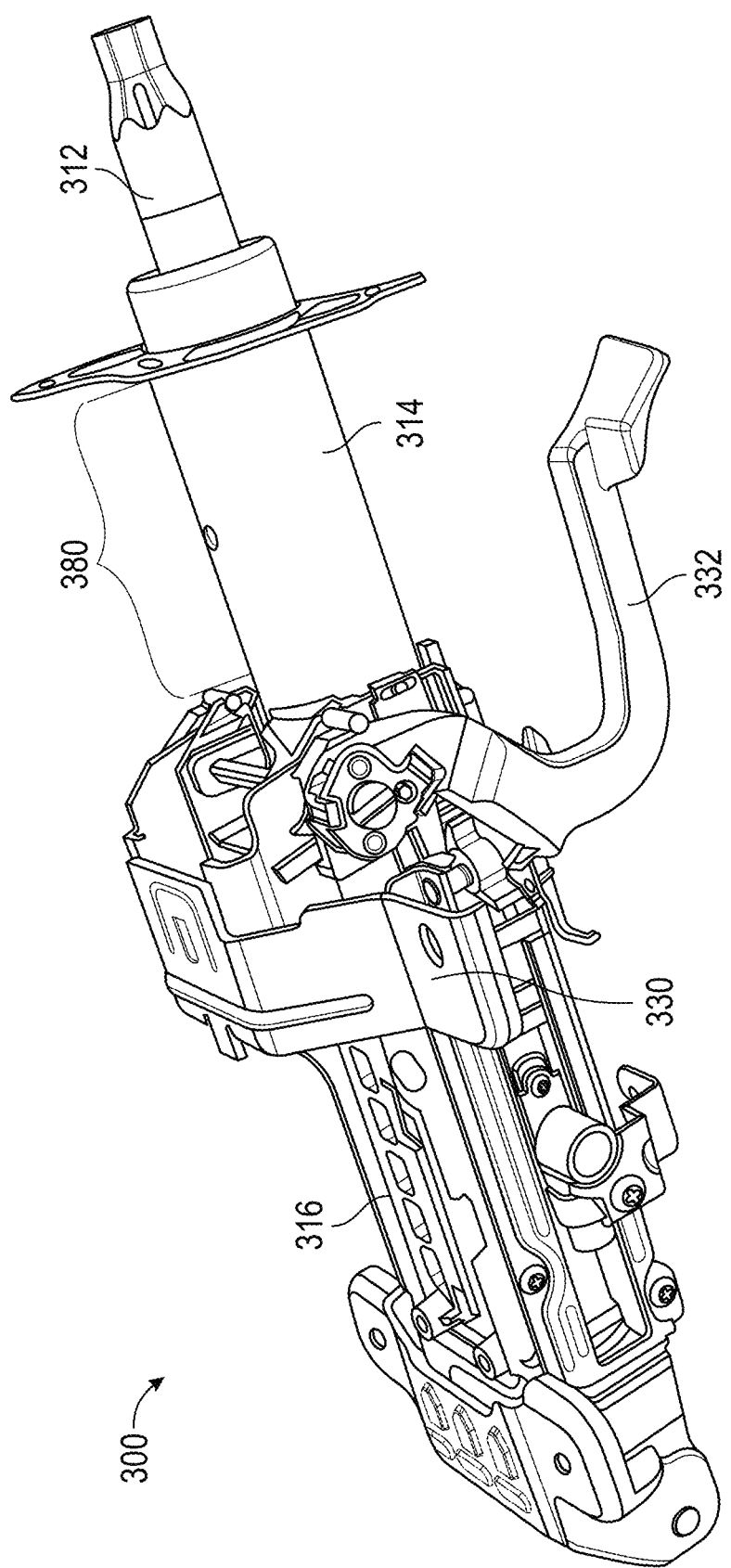
FIG. 3A is a perspective view of a column in a fully extended state in accordance with an example embodiment.
Figure 3B:
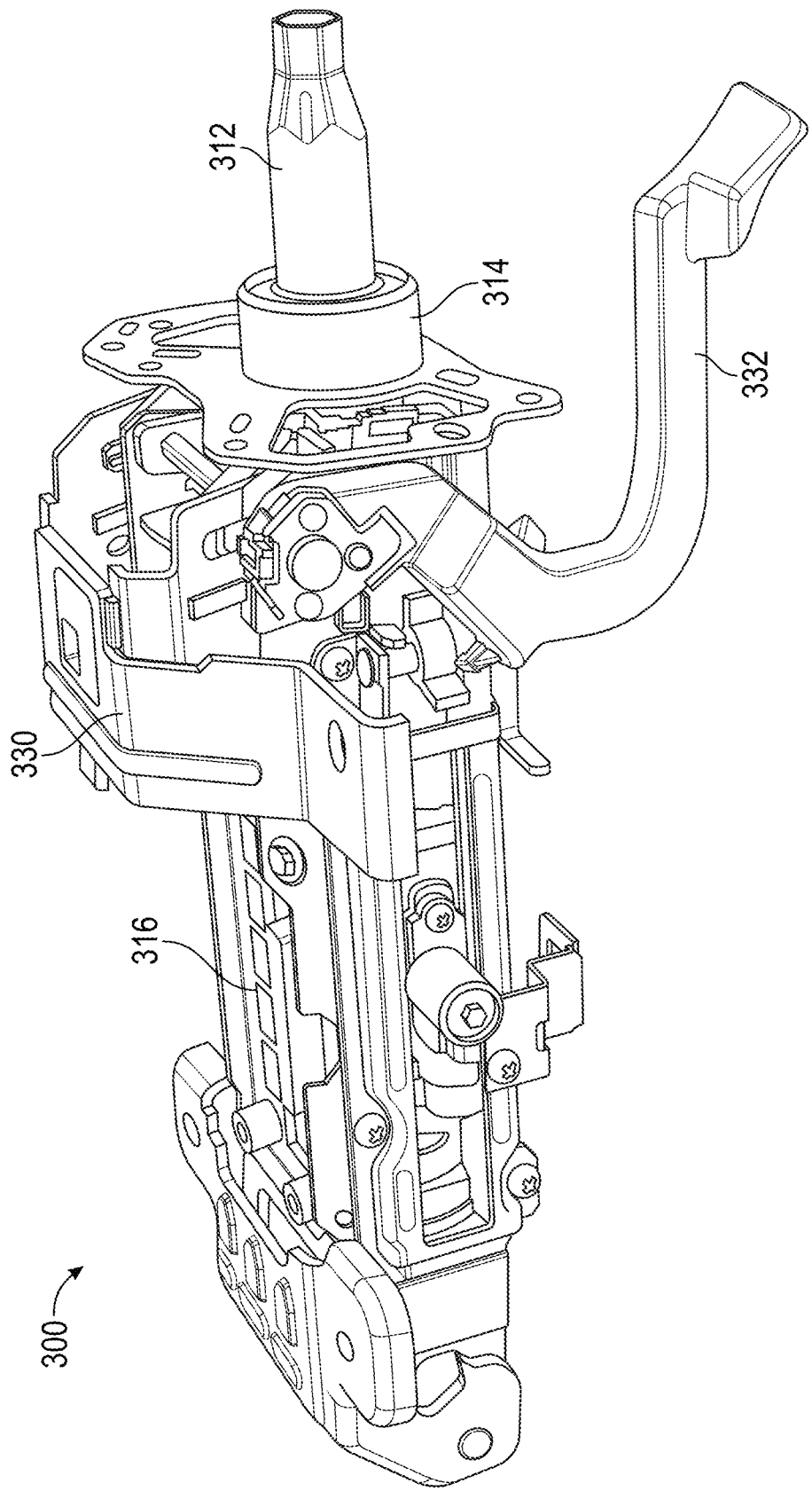
FIG. 3B is a perspective view of the column of FIG. 3A in a fully retracted state in accordance with an example embodiment.
Figure 4:
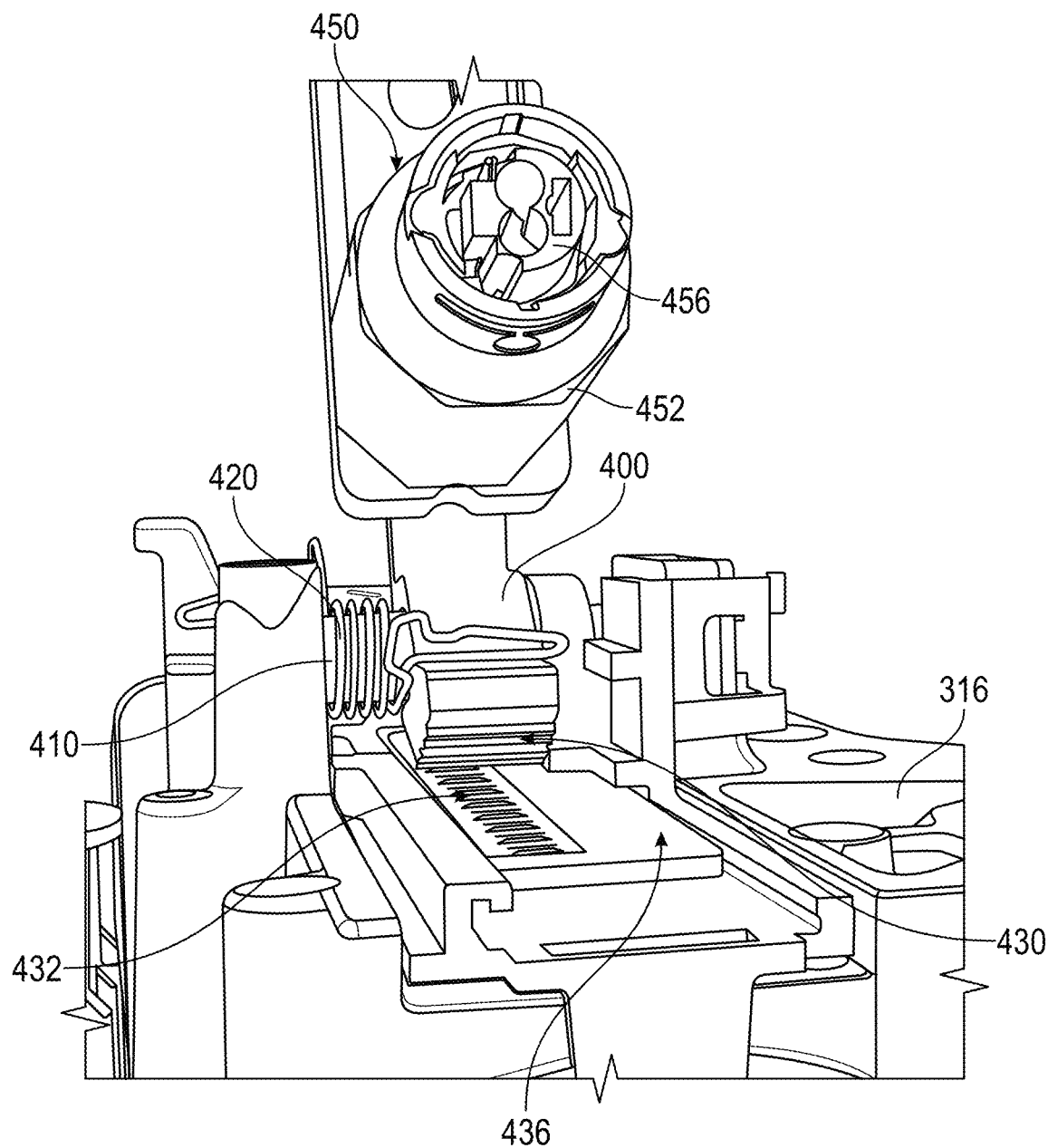
FIG. 4 is a perspective view of a frictional engagement assembly and a pyrotechnic actuator from an upper end of the column in accordance with an example embodiment.
Figure 5:
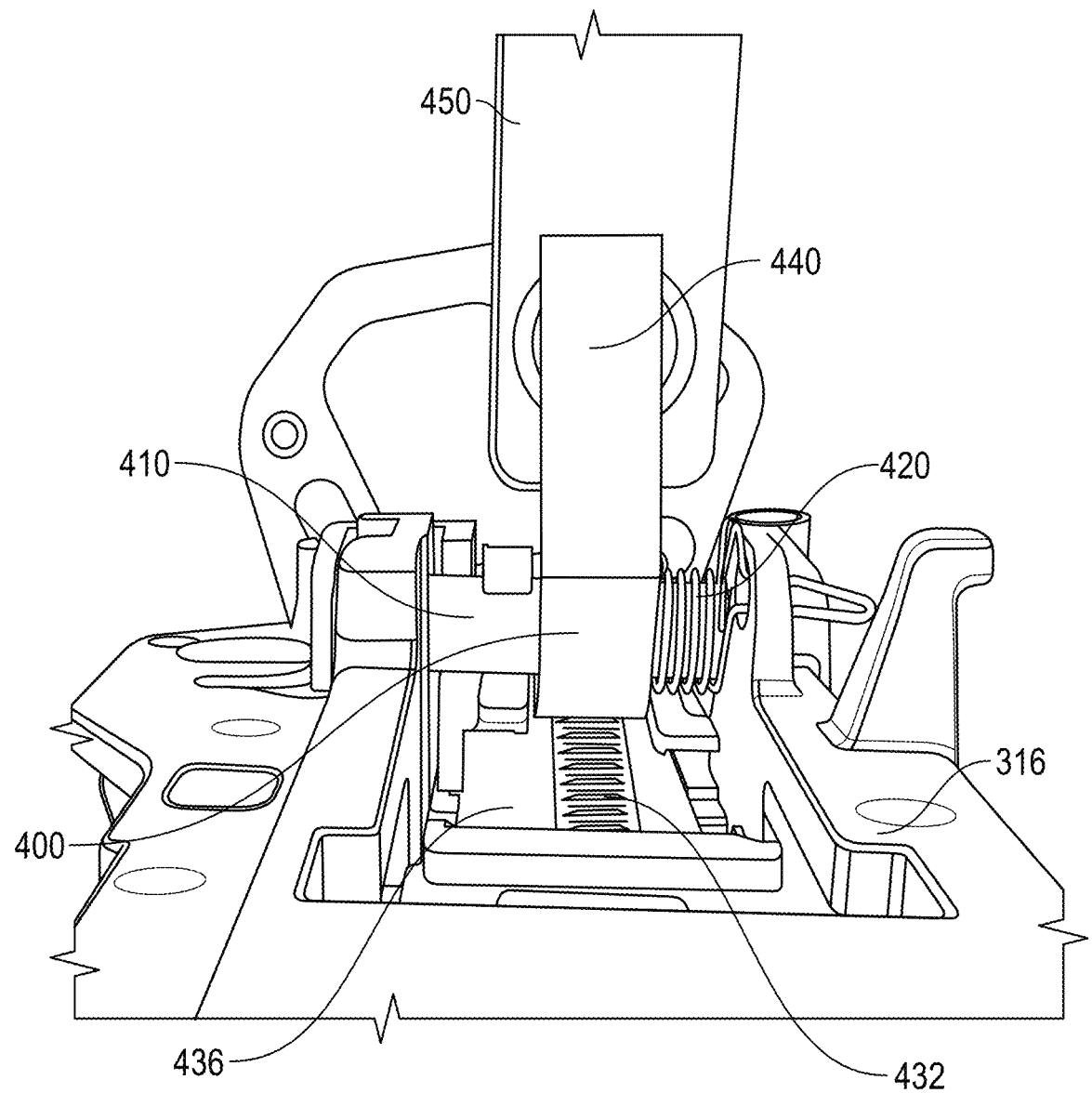
FIG. 5 is a perspective view of the frictional engagement assembly and the pyrotechnic actuator from a lower end of the column in accordance with an example embodiment.
Figure 6:
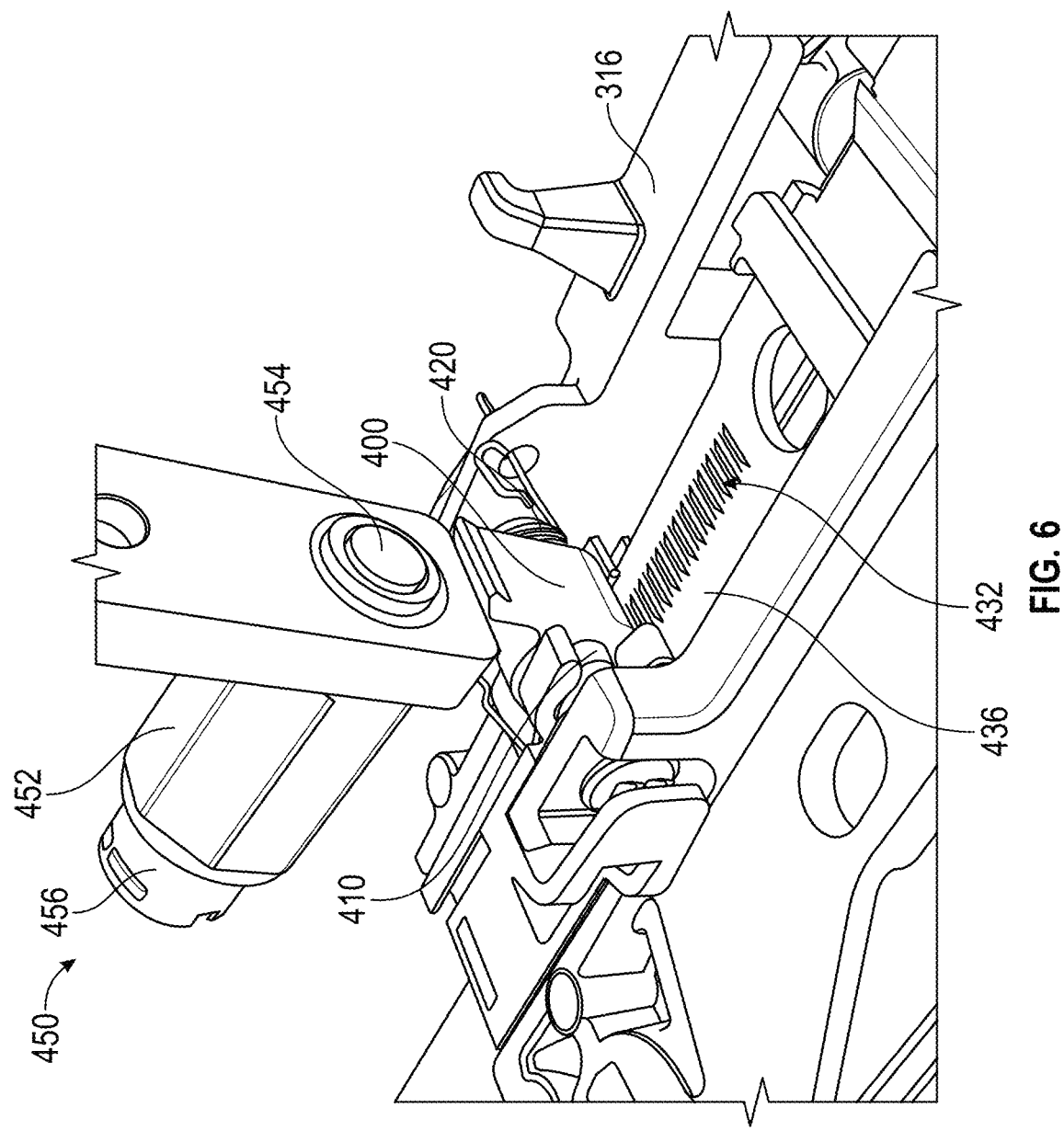
FIG. 6 is a perspective view of the pyrotechnic actuator and an eccentric cam with its lever arm removed to expose an extension pin of the pyrotechnic actuator in accordance with an example embodiment.

FIGS. 3A and 3B show an example structure that may embody the column 210 of FIG. 2. In this regard, column 300 includes include an upper steering shaft 312 operably coupled to an upper steering jacket 314. The upper steering jacket 314 is operably coupled to a lower column casting 316. The upper steering shaft 312, lower column casting 316 and upper steering jacket 314 of FIGS. 3A and 3B are specific structural examples of the upper steering shaft 212, lower column casting 216 and upper steering jacket 214 of FIG. 2. The column 300 further includes a rake bracket 330 and a lever 332, which are examples of the rake bracket 230 and lever 232 of FIG. 2. FIG. 3A shows the column 300 in a fully extended state, and FIG. 3B shows the column 300 in a fully retracted state. In this example, a stroke distance 380 measuring the distance traveled between the fully extended state and the fully retracted state is about 100 mm. However, other examples may be built to different scales, and therefore may have different specific values.

The transition between the fully extended state and the fully retracted state may, in response to a barrier event, be made in about 30 msec for a column 300 of this size (e.g., of about 100 mm). Thus, knowing the timing for retraction for a given column, and knowing other parameters for deployment or actuation of various triggers or components that the ECU or RCM may be engaged in causing, designers can determine exact timing associated with triggering a release of the upper steering jacket 314 relative to the lower column casting 316 (without movement of the lever 332 or any other operable member that is normally used for repositioning of the column 300) to permit the upper steering jacket 314 to retract into the lower column casting 316 to most optimally respond to a barrier event.

As discussed above, in order to provide an opportunity to obtain very specific control of the timing for release of the frictional engagement assembly 234, the time-specific release initiator 240 of FIG. 2 may be employed. FIGS. 4-8 illustrate specific examples of structures that may form examples of the frictional engagement assembly 234 and the time-specific release initiator 240 of FIG. 2, on some of the structures otherwise shown in FIGS. 3A and 3B. However, it should be appreciated that the specific structures disclosed in FIGS. 4-8 are non-limiting examples. Moreover, a number of the structures of FIGS. 3A and 3B are replaced or removed in order to facilitate a clearer view and/or explanation of the structures shown in FIGS. 4-8.

Referring now to FIGS. 4-8, the frictional engagement assembly 234 of FIG. 2 may be embodied as a collection of components including, for example, an eccentric cam 400 that may be mounted on a cam pin 410, which may be operably coupled to the lower column casting 316 or the rake bracket 330 of FIGS. 3A and 3B. In the depicted example of FIGS. 4-8, the cam pin 410 forms a pivot axis about which the eccentric cam 400 pivots or rotates. The eccentric cam 400 may have an first engagement portion 430 disposed at a distal end thereof, and the first engagement portion 430 may include teeth, projections, a grooved, perforated, ribbed, or knurled surface, or other friction enhancing surface or finish thereon.

In an example embodiment, the eccentric cam 400 may have a width (at the pivot axis) that is substantially less than the longitudinal length of the cam pin 410. This arrangement may provide room on the cam pin 410 (e.g., alongside the eccentric cam 400) for placement of a torsion spring 420 or other biasing member. The torsion spring 420 may exert a force on the eccentric cam 400 that biases the first engagement portion 430 toward a second engagement portion 432 (i.e., in the direction of arrow 434) that is disposed at a surface 436 that is operably coupled to the upper steering jacket 314. The surface 436 may be an external jacket or housing of the upper steering jacket 314, or could be an energy absorption strap or other component that is operably coupled to, and generally moves with or is carried by, the upper steering jacket 314. Notably, even if the surface 436 is provided on an energy absorption strap, such strap would not require a breakaway feature that would otherwise be used in conventional designs (i.e., designs reliant on a force versus displacement operating paradigm). The second engagement portion 432 may also include teeth, projections, a grooved, perforated, ribbed, or knurled surface, or other friction enhancing surface or finish thereon, which could be the same, similar or different relative to the first engagement portion 430, but nevertheless capable of frictional engagement with the first engagement portion 430 when the torsion spring 420 is enabled to force the first engagement portion 430 into engagement with the second engagement portion 432.

A proximal end of the eccentric cam 400 (e.g., opposite the distal end at which the first engagement portion 430 is located) may be operably coupled to a lever arm 440. The lever arm 440 may extend by a selected distance away from the pivot axis of the eccentric cam 400 to allow the bias of the torsion spring 420 to be overcome responsive to application of a force on the lever arm 440 in the direction of arrow 442. Thus, the longer the length of the lever arm 440, the lower the amount of force needed in the direction of arrow 442. The force applied in the direction of arrow 442 may be applied by a pyrotechnic actuator 450.

Figure 7:
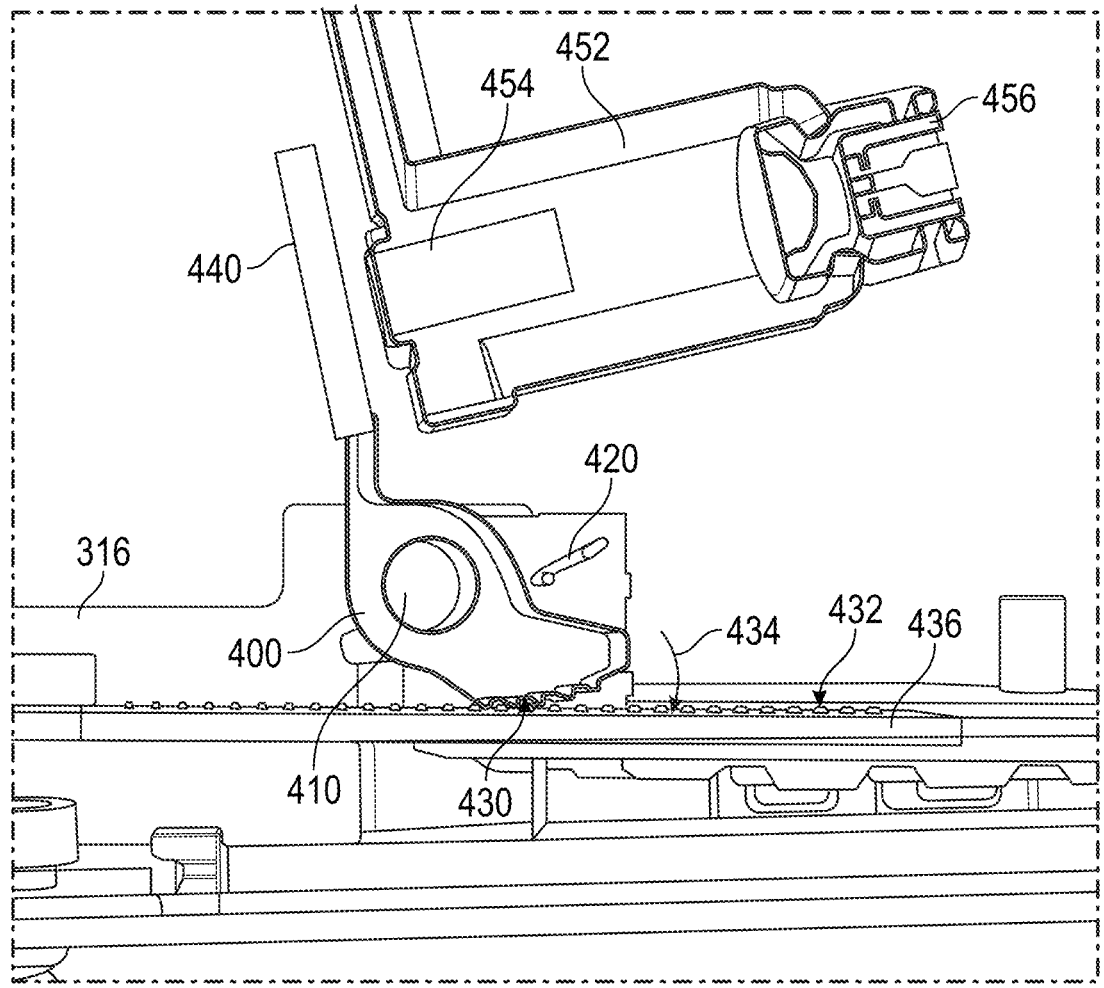
FIG. 7 is a partial cross section view of the pyrotechnic actuator in a pre-detonation state in accordance with an example embodiment.
Figure 8:
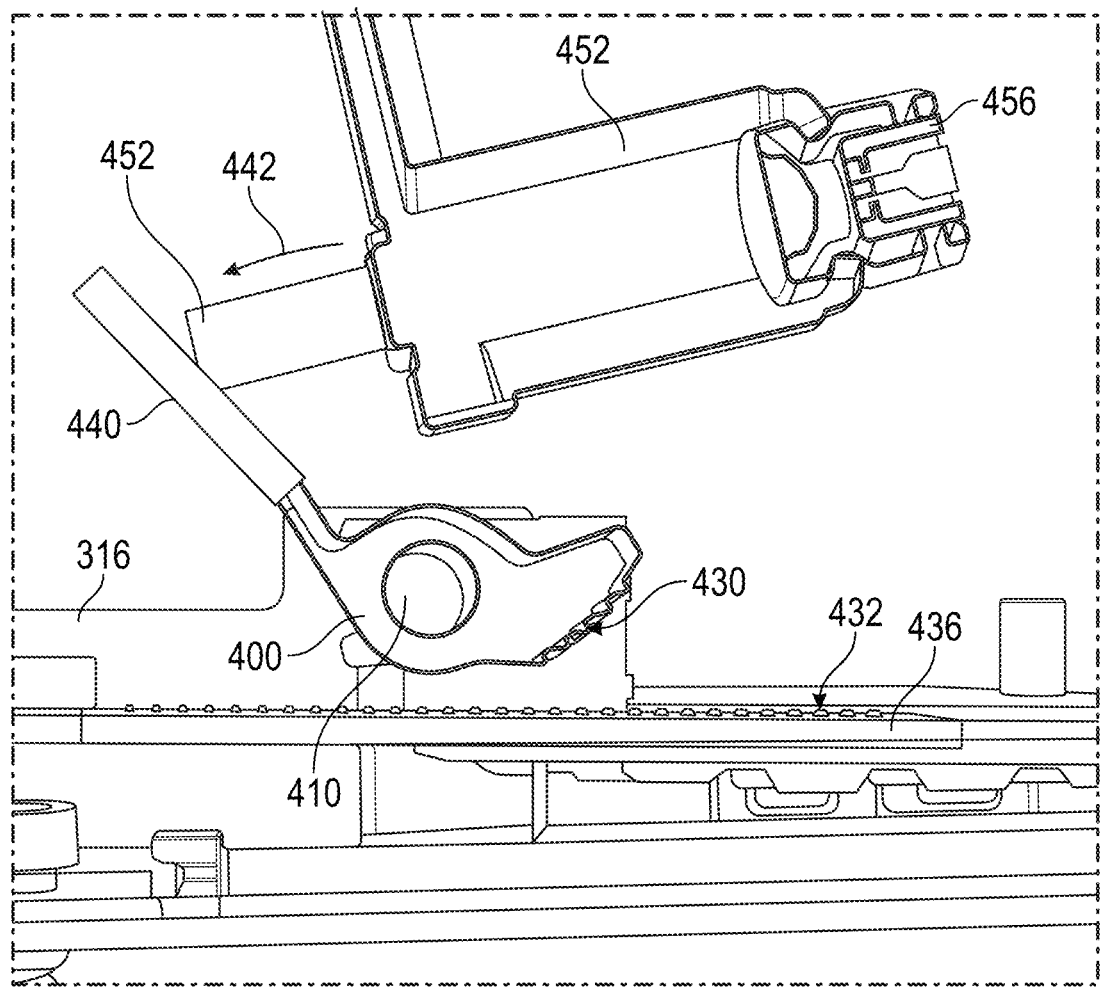
FIG. 8 is a partial cross section view of the pyrotechnic actuator in a post-detonation state in accordance with an example embodiment.

The pyrotechnic actuator 450 may include a housing 452 inside which a charge may be retained and detonated. The housing 452 may be structured to contain the charge therein, when the charge is detonated. However, when the charge is detonated, an extension pin 454 that is otherwise retained inside the housing 452 may be extended rapidly. FIG. 7 shows the extension pin 454 in a pre-detonation state, and fully (or nearly fully) retained inside the housing 452. Meanwhile, FIG. 8 shows the extension pin 454 in a post-detonation state, and fully extended out of the housing 452. A coupling portion 456 may be provided to receive an electrical signal (e.g., the electronic trigger signal 250 of FIG. 2) that detonates the charge when received.

The pyrotechnic actuator 450 may be positioned proximate to the lever arm 440 and poised to apply the force in the direction of arrow 442 when detonated. Thus, for example, a bracket or other structural component may be provided to position the pyrotechnic actuator 450 at a selected distance and angle or orientation relative to the lever arm 440. The charge may be increased or decreased in size, by design, based on the length of the lever arm 440 and the desired response time from the issuance of the electronic trigger signal 250 to the time that the extension pin 454 is expelled from the housing 452 to actuate the lever arm 440 and rotate the eccentric cam 400 to take the first engagement portion 430 out of frictional engagement with the second engagement portion 432. As noted above, the length of the lever arm 440 may be increased to reduce the force, or decreased with use of a larger force. Thus, a size of the charge may be decreased (thereby decreasing the force exerted upon detonation) for use with a longer lever arm 440, or may be increased (thereby increasing the force exerted upon detonation) for use with a shorter lever arm 440.

In operation, the electronic trigger signal 250 may be generated by the controller 140 at a time that temporally positions the release of the first engagement portion 430 from the second engagement portion 432 with proper sequence and spacing from other timed trigger signals that may be employed by the controller 140 in response to a triggering event such as, for example, a barrier event. Various responses to the barrier event, or other triggering events of interest, may therefore be timed for optimal coordination and improved outcomes. Thus, for example, the controller 140 may issue a first trigger either in response to detecting the barrier event, or a selected time after detecting the barrier event. The first trigger may cause deployment of a first response that may be aimed at protecting the occupant from contact with other portions of the cockpit that may be in motion and/or to inhibit motion of the occupant. The controller 140 may then and thereafter, at a predetermined time after detecting the barrier event, or after deployment of the first response, send the electronic trigger signal 250 to enable the column 300 to be retracted. Thus, the retraction of the column 300 may be accomplished without a force versus displacement driven mechanism that necessarily requires a buildup in force that may be different for occupants of different mass, and instead with a specifically timed and therefore consistently timed regardless of the mass of the occupant.

Example embodiments may therefore also include a handwheel actuator for a steer by wire system. The handwheel actuator may include a column for operably coupling a handwheel to other components of the steer by wire system and a feedback actuator operably coupled to the column to provide tactile feedback to the operator responsive to movement of the handwheel. The column may include a lower column portion and an upper column portion that are movable relative to each other to alternately retract the handwheel away from an operator seated in the vehicle or extend the handwheel toward the operator. The column may further include a frictional engagement assembly and a time-specific release initiator. The frictional engagement assembly may be engaged to fix the lower column portion relative to the upper column portion at a selected distance from the operator, and disengaged to enable movement of the upper column portion relative to the lower column portion. The time-specific release initiator may be actuated by an electrical trigger signal to cause the lower column portion and the upper column portion to be disengaged a selected time after a triggering event.

The handwheel actuator of some embodiments (or a steer by wire system including the same) may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the time-specific release initiator may be a pyrotechnic actuator. In an example embodiment, the pyrotechnic actuator may include a housing and an extension pin proximate a charge and, responsive to detonation of the charge, the extension pin may be extended from the housing to disengage the upper column portion from the lower column portion. In some cases, the frictional engagement assembly may include a first engagement portion disposed at one of the upper column portion or the lower column portion, and a second engagement portion disposed at the other of the lower column portion or the upper column portion. In an example embodiment, the first engagement portion is disposed at a first end of an eccentric cam that pivots about a cam pin. A lever arm is disposed at a second end of the eccentric cam, and the extension pin extends from the housing to engage the lever arm to pivot the eccentric cam about the cam pin and cause the first engagement portion to disengage the second engagement portion. In some cases, a biasing member may be operably coupled to the eccentric cam to bias the first engagement portion into contact with the second engagement portion. In an example embodiment, the biasing member may include a torsion spring mounted on the cam pin adjacent to the eccentric cam. In some cases, each of the first engagement portion and the second engagement portion may include a friction enhancing surface. In an example embodiment, the first engagement portion may be disposed on a surface of the upper column portion. In some cases, the upper column portion may telescopically retract into the lower column portion until the upper column portion is fully retracted into an instrument panel of the vehicle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A handwheel actuator for a steer by wire system of a vehicle, the handwheel actuator comprising:
   a column for operably coupling a handwheel to other components of the steer by wire system, the column comprising a lower column portion and an upper column portion that are movable relative to each other to alternately retract the handwheel away from an operator seated in the vehicle or extend the handwheel toward the operator; and
   a feedback actuator operably coupled to the column to provide tactile feedback to the operator responsive to movement of the handwheel,
   wherein the column further comprises a frictional engagement assembly and a time-specific release initiator,
   wherein the frictional engagement assembly is engaged to fix the lower column portion relative to the upper column portion at a selected distance from the operator, and disengaged to enable movement of the upper column portion relative to the lower column portion, and
   wherein the time-specific release initiator is actuated by an electrical trigger signal initiated a predetermined time delay after detecting a triggering event to cause the lower column portion and the upper column portion to be disengaged.

2. The handwheel actuator of claim 1, wherein the time-specific release initiator comprises a pyrotechnic actuator.

3. The handwheel actuator of claim 2, wherein the pyrotechnic actuator comprises a housing and an extension pin proximate a charge, and wherein responsive to detonation of the charge, the extension pin is extended from the housing to disengage the upper column portion from the lower column portion.

4. The handwheel actuator of claim 3, wherein the frictional engagement assembly comprises a first engagement portion disposed at one of the upper column portion or the lower column portion, and a second engagement portion disposed at the other of the lower column portion or the upper column portion.

5. The handwheel actuator of claim 4, wherein each of the first engagement portion and the second engagement portion include a friction enhancing surface.

6. The handwheel actuator of claim 4, wherein the first engagement portion is disposed on a surface of the upper column portion.

7. The handwheel actuator of claim 1, wherein the upper column portion telescopically retracts into the lower column portion until the upper column portion is fully retracted into an instrument panel of the vehicle.

8. A handwheel actuator for a steer by wire system of a vehicle, the handwheel actuator comprising:
- a column for operably coupling a handwheel to other components of the steer by wire system, the column comprising a lower column portion and an upper column portion that are movable relative to each other to alternately retract the handwheel away from an operator seated in the vehicle or extend the handwheel toward the operator; and
- a feedback actuator operably coupled to the column to provide tactile feedback to the operator responsive to movement of the handwheel,
- wherein the column further comprises a frictional engagement assembly and a time-specific release initiator,
- wherein the frictional engagement assembly is engaged to fix the lower column portion relative to the upper column portion at a selected distance from the operator, and disengaged to enable movement of the upper column portion relative to the lower column portion, and
- wherein the time-specific release initiator is actuated by an electrical trigger signal to cause the lower column portion and the upper column portion to be disengaged a selected time after a triggering event,
- wherein the frictional engagement assembly comprises a first engagement portion disposed at one of the upper column portion or the lower column portion, and a second engagement portion disposed at the other of the lower column portion or the upper column portion,
- wherein the first engagement portion is disposed at a first end of an eccentric cam that pivots about a cam pin,
- wherein a lever arm is disposed at a second end of the eccentric cam, and
- wherein an extension pin extends from a housing of the time-specific release initiator to engage the lever arm to pivot the eccentric cam about the cam pin and cause the first engagement portion to disengage the second engagement portion.

9. The handwheel actuator of claim 8, wherein a biasing member is operably coupled to the eccentric cam to bias the first engagement portion into contact with the second engagement portion.

10. The handwheel actuator of claim 9, wherein the biasing member comprises a torsion spring mounted on the cam pin adjacent to the eccentric cam.

11. A steer by wire system of a vehicle, the system comprising:
- a steering assembly operably coupled to steerable wheels of the vehicle;
- a steering motor operably coupled to the steering assembly;
- a handwheel actuator operably coupled to a handwheel of the vehicle to receive steering inputs from an operator of the vehicle; and
- a controller operably coupled to the handwheel actuator and the steering motor to translate the steering inputs to control signals for the steering motor,
- wherein the handwheel actuator comprises:
- a column comprising a lower column portion and an upper column portion that are movable relative to each other to alternately retract the handwheel away from the operator or extend the handwheel toward the operator; and
- a feedback actuator operably coupled to the column to provide tactile feedback to the operator responsive to movement of the handwheel,
- wherein the column further comprises a frictional engagement assembly and a time-specific release initiator,
- wherein the frictional engagement assembly is engaged to fix the lower column portion relative to the upper column portion at a selected distance from the operator, and disengaged to enable movement of the upper column portion relative to the lower column portion, and
- wherein the time-specific release initiator is actuated by an electrical trigger signal initiated a predetermined time delay after detecting a triggering event to cause the lower column portion and the upper column portion to be disengaged.

12. The system of claim 11, wherein the time-specific release initiator comprises a pyrotechnic actuator.

13. The system of claim 12, wherein the pyrotechnic actuator comprises a housing and an extension pin proximate a charge, and
wherein responsive to detonation of the charge, the extension pin is extended from the housing to disengage the upper column portion from the lower column portion.

14. The system of claim 13, wherein the frictional engagement assembly comprises a first engagement portion disposed at one of the upper column portion or the lower column portion, and a second engagement portion disposed at the other of the lower column portion or the upper column portion.

15. The system of claim 14, wherein the first engagement portion is disposed at a first end of an eccentric cam that pivots about a cam pin,
wherein a lever arm is disposed at a second end of the eccentric cam, and
wherein the extension pin extends from the housing to engage the lever arm to pivot the eccentric cam about the cam pin and cause the first engagement portion to disengage the second engagement portion.

16. The system of claim 15, wherein a biasing member is operably coupled to the eccentric cam to bias the first engagement portion into contact with the second engagement portion.

17. The system of claim 16, wherein the biasing member comprises a torsion spring mounted on the cam pin adjacent to the eccentric cam.

18. The system of claim 14, wherein each of the first engagement portion and the second engagement portion include a friction enhancing surface.

19. The system of claim 14, wherein the first engagement portion is disposed on a surface of the upper column portion.

20. The system of claim 11, wherein the upper column portion telescopically retracts into the lower column portion until the upper column portion is fully retracted into an instrument panel of the vehicle.

\* \* \* \* \*